(12) United States Patent
Hiruma et al.

(10) Patent No.: US 7,413,799 B2
(45) Date of Patent: Aug. 19, 2008

(54) REFLECTIVE FILM AND REFLECTIVE PLATE

(75) Inventors: Takashi Hiruma, Nagahama (JP); Miki Nishida, Nagahama (JP); Takayuki Watanabe, Nagahama (JP); Kazunari Katsuhara, Nagahama (JP); Jun Takagi, Nagahama (JP)

(73) Assignee: Mitsubishi Plastics, Inc., Tokyo (JP)

( * ) Notice: Subject to any disclaimer, the term of this patent is extended or adjusted under 35 U.S.C. 154(b) by 54 days.

(21) Appl. No.: 11/630,121

(22) PCT Filed: Nov. 14, 2005

(86) PCT No.: PCT/JP2005/020807

§ 371 (c)(1),
(2), (4) Date: Jan. 9, 2007

(87) PCT Pub. No.: WO2006/054505

PCT Pub. Date: May 26, 2006

(65) Prior Publication Data

US 2007/0244224 A1    Oct. 18, 2007

(30) Foreign Application Priority Data

Nov. 16, 2004  (JP) ............................. 2004-331450
Jul. 19, 2005   (JP) ............................. 2005-208941

(51) Int. Cl.
*B32B 27/18* (2006.01)
*B32B 27/20* (2006.01)
*B32B 27/30* (2006.01)
*B32B 27/32* (2006.01)
*B32B 27/36* (2006.01)

(52) U.S. Cl. .................. 428/328; 428/212; 428/421; 428/480; 428/522; 428/323; 106/436; 524/497; 524/499; 524/413

(58) Field of Classification Search ........................ None
See application file for complete search history.

(56) References Cited

U.S. PATENT DOCUMENTS

| 3,939,244 | A | * | 2/1976 | Piccolo et al. ................. 423/76 |
| 4,310,584 | A | * | 1/1982 | Cooper et al. ................. 428/212 |
| 5,122,905 | A | * | 6/1992 | Wheatley et al. ............ 359/586 |
| 5,486,949 | A | * | 1/1996 | Schrenk et al. ............. 359/498 |
| 5,972,445 | A | * | 10/1999 | Kimura et al. ............. 428/35.4 |
| 6,040,941 | A | * | 3/2000 | Miwa et al. ................. 359/443 |
| 6,150,012 | A | * | 11/2000 | Matsui et al. ............... 428/216 |
| 6,243,521 | B1 | * | 6/2001 | Owaki et al. ................. 385/123 |
| 6,846,606 | B1 | | 1/2005 | Laney et al. |
| 6,914,719 | B2 | * | 7/2005 | Koyama et al. ............. 359/361 |
| 2005/0112351 | A1 | | 5/2005 | Laney et al. |
| 2005/0121620 | A1 | | 6/2005 | Laney et al. |
| 2007/0030574 | A1 | * | 2/2007 | Watanabe .................... 359/667 |
| 2007/0054089 | A1 | * | 3/2007 | Watanabe et al. ........... 428/131 |
| 2007/0092710 | A1 | * | 4/2007 | Watanabe ................ 428/304.4 |
| 2007/0202320 | A1 | * | 8/2007 | Watanabe et al. ........... 428/327 |

FOREIGN PATENT DOCUMENTS

| JP | 04-239540 A | | 8/1992 |
| JP | 04-191048 | * | 9/1992 |
| JP | 06-298957 A | | 10/1994 |
| JP | 07-230004 A | | 8/1995 |
| JP | 07-287110 A | | 10/1995 |
| JP | 08-025597 | * | 1/1996 |
| JP | 08-262208 A | | 10/1996 |
| JP | 11-100452 | * | 4/1999 |
| JP | 11-149816 A | | 6/1999 |
| JP | 11-174213 A | | 7/1999 |
| JP | 11-245295 | * | 9/1999 |
| JP | 2002-138150 A | | 5/2002 |
| JP | 2002-333511 | * | 11/2002 |
| JP | 2002-333511 A | | 11/2002 |
| JP | 2004-051775 | * | 2/2004 |
| JP | 2004-051775 A | | 2/2004 |
| JP | 2005-049573 | * | 2/2005 |
| JP | 2005-049573 A | | 2/2005 |
| WO | WO 2004/104077 | * | 12/2004 |
| WO | WO-2005/052655 A1 | | 6/2005 |
| WO | WO-2005/052952 A1 | | 6/2005 |

* cited by examiner

*Primary Examiner*—Vivian Chen
(74) *Attorney, Agent, or Firm*—Darby & Darby P.C.

(57) ABSTRACT

A reflective film includes a substantially non-drawn film having a layer A that includes a resin composition A containing a resin having a refractive index of less than 1.52 and titanium oxide. The titanium oxide has a refractive index of 2.5 or more, and a vanadium content of 5 ppm or less, and the film has a light reflectance of 95% or more to light having a wavelength of 550 nm, and a heat shrinkage ratio after treatment at 80° C. for 180 minutes of greater than −0.1% and less than 1.0% in both a longitudinal direction (MD) and in a transverse direction (TD).

11 Claims, No Drawings

REFLECTIVE FILM AND REFLECTIVE PLATE

CROSS-REFERENCE TO PRIOR APPLICATIONS

This is a U.S. national phase application under 35 U.S.C. §371 of International Patent Application No. PCT/JP2005/020807, filed Nov. 14, 2005, and claims the benefit of Japanese Application No. 2004-331450, filed Nov. 16, 2004, and Japanese Application No. 2005-208941, filed Jul. 19, 2005, all of which are incorporated by reference herein. The International Application was published in Japanese on May 26, 2006 as International Publication No. WO 2006/054505 A1 under PCT Article 21(2).

TECHNICAL FIELD

The present invention relates to a reflective film and to a reflective plate provided with the reflective film. More particularly, the present invention relates to a reflective film for use in a reflective plate in a liquid crystal display device, a lighting apparatus, and an illuminated sign.

BACKGROUND ART

Recently, reflective films are used in the fields of a reflective plate for use in a liquid crystal display, a member for a projection screen or a planar light source, a reflective plate for a lighting apparatus, and an illuminated sign. In the case of, for example, reflective plates in liquid crystal displays, reflective films having high light reflectance are demanded in order to supply light to liquid crystals as much as possible to improve the performance of the back light unit in response to the requirements of providing a larger screen of a liquid crystal device and higher displaying performance.

Further, as a display device in, for example, a notebook-type computer, there has been used a liquid crystal display device provided with a back light unit and liquid crystal display elements, which can be designed to have a reduced thickness and provide images that are easy to watch. Such back light units mostly include back light units of an edge-light system that has a transmission light guide plate provided on one end thereof a linear light source such as a fluorescent tube. In most of such edge-light systems, one side of the light guide plate is partially covered with a light diffusion material and that side is entirely covered with a reflective material to constitute a planar light source. Such a reflective material is required to have a high reflecting performance.

Japanese Patent Application Laid-open No. Hei 4-239540 and Japanese Patent Application Laid-open No. 2002-138150 disclose white polyester films obtained by drawing a sheet comprised by an aromatic polyester-based resin and a filler to form minute voids in the sheet to allow light scattering reflection. However, these films fail to provide the required high light reflectance. Further, the aromatic rings contained in the molecular chains of the aromatic polyester-based resin that constitutes the films absorb ultraviolet rays, so that the films are deteriorated and yellowed due to the ultraviolet rays from the light source of the liquid crystal display device and the like. This leads to the disadvantage of a reduced light reflectance of the reflective film.

Further, Japanese Patent Application Laid-open No. Hei 11-174213 discloses a porous sheet obtained by drawing a sheet made from a polypropylene resin to which an inorganic filler is added. In this case, it is necessary to add the inorganic filler in an amount of 60% by weight or more, so that there arises the problem that the film forming ability is poor.

Further, Japanese Patent Application Laid-open No. Hei 6-298957 discloses a film obtained by mixing a resin having a specified refractive index and an inorganic filler and drawing a film made from the mixture. Japanese Patent Applications Laid-open Nos. Hei 7-230004, Hei 7-287110, and Hei 8-262208 disclose reflective sheets obtained by mixing a polyolefin-based resin and an inorganic filler and drawing a film made from the mixture. Japanese Patent Application Laid-open No. Hei 11-149816 discloses a reflective film obtained by mixing a polyolefin and barium sulfate and drawing a film made from the mixture. In these case, however, a measure for improving the drawability, for example, addition of a processing auxiliary must be taken. Moreover, although the resultant film has an increased light reflectance by drawing, there arises another problem that it suffers from not a small size change with time or in a heated environment due to the phenomenon of orientational relaxation.

SUMMARY OF THE INVENTION

The present invention has been achieved with a view to solving the above-mentioned problems and it is an object of the present invention to provide a reflective film that has an excellent light reflectance, that does not undergo yellowing or a decrease in light reflectance with time when in use, and that has excellent dimension stability.

The reflective film of the present invention is characterized in that it is a substantially non-drawn film obtained by using a resin composition A that contains a resin having a refractive index of less than 0.52 and titanium oxide. The titanium oxide has a refractive index of 2.5 or more and a vanadium content of 5 ppm or less. The reflective film has a light reflectance of 95% or more to light with a wavelength of 550 nm and a heat shrinkage ratio of greater than −0.1% and less than 1.0% in both longitudinal direction (MD) and transverse direction (TD) after treatment at 80° C. for 180 minutes.

Here, the content of the titanium oxide may be 10 mass % or more and 60 mass % or less in theresin composition A. Also, the content of the titanium oxide may be 30 mass % or more and 60 mass % or less.

The reflective film of the present invention may further have a layer B comprised by a resin composition B containing a fine powder filler on the side of an outer surface of the layer A comprised by the resin composition A. In this case, the amount of the fine powder filler contained in the layer B is smaller than the amount of the titanium oxide contained in the layer A.

Here, the layer B may contain 30 mass % or less of the fine powder filler in the resin composition B.

In the present invention, the fine powder filler contained in the layer B may be titanium oxide.

In the present invention, the surface of the titanium oxide may be coated with at least one inert inorganic oxide selected from the group consisting of silica, alumina, and zirconia.

Further, the titanium oxide may have an average particle size of 0.1 μm or more and 1.0 μm or less.

In the present invention, the resin having a refractive index of less than 1.52 may include at least one resin selected from the group consisting of polyolefin-based resins, acrylic-based resins, fluoro-based resins, and aliphatic polyester-based resins.

The reflective plate of the present invention may have any one of the above-mentioned reflective films.

According to the present invention, a reflective film that has an excellent light reflectance, that does not undergo yellowing or a decrease in light reflectance with time when in use, and that has excellent dimension stability can be obtained. Further, by covering a metal plate or resin plate with the reflective film of the present invention, reflective plates that have excellent well-balanced characteristics such as light reflecting properties and that can be used for a liquid crystal display device, a lighting apparatus, an illuminated sign and so on can be obtained.

DETAILED DESCRIPTION OF THE INVENTION

Hereinafter, the present invention will be explained in more detail.

The reflective film of the present invention has a layer A obtained by using a resin composition A containing a resin having a refractive index of less than 1.52 and titanium oxide. Note that the titanium oxide must have a refractive index of 2.5 or more and a vanadium content of 5 ppm or less.

Note that in accordance with the definition in Japanese Industrial Standards (JIS), "film" refers to a thin, flat product which has a relatively very small thickness as compared with length and width with a maximum thickness being arbitrarily limited and is usually supplied in the form of a roll while "sheet" refers to a thin, flat product generally having a relatively small thickness as compared with length and width (Japan Industrial Standards IIS K-6900). Accordingly, among sheets those having particularly small thicknesses may be termed as films. However, there is no clear-cut boundary between "sheet" and "film," so that in the present application, "films" may be understood as also including "sheets" and "sheets" may be understood as also including "films."

Titanium oxide has a high refractive index and when titanium oxide is used, a difference in refractive index between the base resin and the titanium oxide can be greater, so that the film can be imparted with a high reflecting performance with a smaller blending amount than the case where a filler other than the titanium oxide is used. Further, when titanium oxide is used, a film having a high reflecting performance can be obtained even with a small film thickness.

Titanium oxides include those titanium oxides having a crystal structure, such as those of anatase-type and rutile-type. An example of the titanium oxide having a refractive index of 2.5 or more is rutile-type titanium oxide. From the viewpoint of increasing a refractive index difference from the base resin that constitutes the film, it is preferably titanium oxide having a refractive index of 2.6 or more. Rutile-type titanium oxide satisfies this condition too. The greater the refractive index difference, the refractive scatter effect of light at the interface between the base resin and the titanium oxide becomes greater, so that the film can be imparted with light reflecting properties with ease.

To impart a film with a high light reflectance, it is necessary to use titanium oxide that has low light absorbing performance for visible light. To decrease light absorbing performance of titanium oxide, it is preferable that the amount of coloring elements contained in the titanium oxide is small. For example, when titanium oxide having a vanadium content of 5 ppm or less is used, a reflective film having a high light reflectance can be obtained. Further, from the viewpoint of making light absorbing performance lower, it is preferable that the amounts of coloring elements contained in titanium oxide, such as iron, niobium, copper, and manganese are small.

Titanium oxide produced by a chlorine method has a high purity and this production method can afford titanium oxide having a vanadium content of 5 ppm or less. In the chlorine method, rutile ore whose main component is titanium oxide is allowed to react with chlorine gas in a high temperature furnace at about 1,000° C. to first produce titanium tetrachloride. Then, the titanium tetrachloride is burned with oxygen to obtain high purity titanium oxide. Note that a sulfuric acid method is known to be a production method of titanium oxide on an industrial scale. However, titanium oxide obtained by this method contains a large amount of coloring elements such as vanadium, iron, copper, manganese, and niobium, so that the light absorbing performance for visible light becomes high.

Preferably, grains of the titanium oxide used in the layer A have a surface coated with an inert inorganic oxide. By coating the surface of the titanium oxide grains with the inert inorganic oxide, the photocatalytic activity of titanium oxide can be suppressed, thereby increasing the light-resistance of the film. It is preferable to use at least one member selected from the group consisting of silica, alumina, and zirconia as the inert inorganic oxide. Use of these inert inorganic oxides can increase the light-resistance of films without deteriorating high light reflectance that is exhibited when titanium oxide is used. Further, it is more preferable that two or more inert inorganic oxides are used in combination. Among them, combinations that contain silica as an essential component are particularly preferable.

Alternatively, to improve the dispersibility of titanium oxide into the resin, the surface of the grains of titanium oxide may be surface-treated with at least one inorganic compound selected from the group consisting of, for example, siloxane compounds and silane coupling agents or at least one organic compound selected from the group consisting of, for example, polyols and polyethylene glycols. This treatment may be used in combination with the above-mentioned coating treatment with the inert inorganic oxide.

Preferably, the titanium oxide used in the present invention has a particle diameter of 0.1 µm or more and 1.0 µm or less, more preferably 0.2 µm or more and 0.5 µm or less. When the particle diameter of the fine titanium oxide is 0.1 µm or more, the dispersibility of the fine titanium oxide in the aliphatic polyester-based resin is good, so that a uniform film can be obtained therefrom. On the other hand, when the particle diameter of the fine titanium oxide is 1.0 µm or less, the interface between the aliphatic polyester-based resin and the titanium oxide is formed densely, so that the reflective films can be imparted a high light reflectance.

Taking into consideration, for example, the light reflecting performance, mechanical properties, and productivity of the film, the content of the titanium oxide in the layer A, is preferably 10 mass % or more, and is preferably 60 mass % or less, based on the total mass of the resin composition A used for forming a reflective film. The content of the titanium oxide in the layer A, is more preferably 20 mass % or more, still more preferably 30 mass % or more, and particularly preferably 35 mass % or more, and on the other hand, is more preferably 55 mass % or less, and is still more preferably 50 mass % or less, based on the total mass of the resin composition A. When the content of the titanium oxide is 10 mass % or more, a sufficient area of the interface between the base resin and the titanium oxide can be ensured, so that the film can be imparted with a high light reflectance. Further, when the content of the titanium oxide is 60 mass % or less, the mechanical properties required for the film can be ensured. Note that the layer A may contain a fine powder filler other than titanium oxide as far as they do not deteriorate the effects of the present invention. In this case, it is preferable that the titanium oxide and the additional fine powder filler are blended such that the sum of the contents of the titanium oxide and the fine powder filler is within the above-mentioned ranges.

Further, the resin composition A that constitutes the reflective film of the present invention contains a resin having a refractive index of less than 1.52 and titanium oxide. The base resin having a refractive index of less than 1.52 preferably has a refractive index of 1.50 or less.

Examples of the resin having a refractive index of less than 1.52 (hereinafter, this may be referred to a low-refractive index resin) include acrylic-based resins having a refractive index of about 1.49, aliphatic polyester-based resins having a refractive index of 1.51 to 1.45, fluoro-based resins having a refractive index of 1.3 to 1.46, polyolefin-based resins such as polyethylene-based resins and polypropylene-based resins, having a refractive index of about 1.50. Note that among the aliphatic polyester-based resins, lactic acid based resins having a refractive index of 1.45 are particularly preferably used. Further, among the polyolefin-based resins, polypropylene-based resins are particularly preferably used.

The acrylic resin used in the present invention is a resin that contains acrylic acid as a main component and methyl methacrylate resins obtained by polymerizing methyl methacrylic acid are preferably used as such. The methyl methacrylate resin may be copolymerized with other copolymerizable acrylic acids in order to improve their moldability. Examples of the other copolymerizable acrylic acid include monofunctional monomers such as (meth)acrylates and styrene, and polyfunctional monomers having two or more unsaturated double bonds in the molecule, such as (poly)alkylene glycol (meth)acrylates, allyl(meth)acrylates, trimethylolpropane tri(meth)acrylates, and divinylbenzene.

The acrylic-based resin preferably has a molecular weight of about 60,000 to about 150,000 and can be obtained by suspension polymerization or mass polymerization. The acrylic-based resin used in the present invention has a melt flow rate (MFR) (230° C./37.3 N) of preferably 0.5 or more and 20 or less. Also, the acrylic-based resin has a Vicat softening temperature of preferably 85° C. or more, and more preferably 95° C. or more.

Commercially available examples of the acrylic-based resin include SUMIPEX series manufactured by Sumitomo Chemical Co., Ltd. and ACRYPET series manufactured by Mitsubishi Rayon Co., Ltd.

Note that to improve the impact resistance of the resultant film, an elastomer (rubber) component maybe blended in the acrylic-based resin as far as the refractive index of the resultant will not be 1.52 or more. The elastomer component used is not particularly limited and for example, acrylic-based rubbers and aliphatic polyesters are preferably used.

The acrylic-based rubbers include, for example, crosslinked alkyl(meth)acrylate rubber polymer comprised by alkyl(meth)acrylate containing no double bonds and a crosslinking agent, to which for example, methyl methacrylate, styrene or acrylonitrile is graft-polymerized.

Examples of the alkyl(meth)acrylates include alkyl acrylates such as methyl acrylate, ethyl acrylate, n-propyl acrylate, n-butyl acrylate, 2-ethylhexyl acrylate, ethoxy ethoxyethyl acrylate, methoxy tripropylene glycol acrylate, and 4-hydroxybutyl acrylate, and alkyl methacrylates such as hexyl methacrylate, 2-ethylhexyl methacrylate, lauryl methacrylate, tridecyl methacrylate, and stearyl methacrylate.

The aliphatic-based polyesters used as elastomer components have a glass transition temperature of less than 0° C., more preferably less than −20° C. Such aliphatic-based polyesters may be blended with the acrylic-based resin to improve fracture resistance. This is because the aliphatic-based polyesters having a glass transition temperature less than 0° C. mainly have their functions as elastic elastomers. The aliphatic polyesters having a glass transition temperature less than 0° C. include, for example, "BIONOLE" (registered trademark) 3000 series resins manufactured by Show a High polymer Co., Ltd. and GS-Pla manufactured by Mitsubishi Chemical Corporation.

The fluoro-based resin used in the present invention is a resin that contains fluorine atom in the molecular structure and has a refractive index of less than 1.52. As far as it has a refractive index of less than 1.52, the fluoro-based resin may be a copolymer with one or more other resins. The fluoro-based resins include various ones depending on the number of fluorine atoms contained in the molecule and the polymerization method. Examples of the fluoro-based resins include tetrafluoroethylene resins (PTFE), tetrafluoroethylene/perfluoroalkyl vinyl ether copolymer resins (PFA), tetrafluoroethylene/hexafluoropropylene copolymer resins (FEP), tetrafluoroethylene/ethylene copolymer resins (ETFE), vinylidene fluoride resins (PVDF), chlorotrifluoroethylene (PCTFE), polyvinyl fluorides (PVF), ethylene/chlorotrifluoroethylene copolymer resins (ECTFE), and tetrafluoroethylene/perfluorodimethyldioxol copolymer resins (TFE/PDD).

Among these, tetrafluoroethylene/hexafluoropropylene copolymer resins (FEP) that can be melt kneading extrusion and has a refractive index of 1.34 and tetrafluoroethylene/ethylene copolymer resins (ETFE) having a refractive index of 1.40 are preferably used.

The polyolefin resins used in the present invention include those resins that contain as major components thereof monoolefin-based polymers such as polyethylenes, polypropylenes, and copolymers thereof. Specific examples of the polyolefin-based resin include polyethylene-based resins such as low density polyethylenes, linear low density polyethylenes(ethylene/α-olefin copolymers), medium density polyethylenes, and high density polyethylenes; polypropylene-based resins such as polypropylenes and ethylene/propylene copolymers; poly-4-methylpentenes, polybutenes, ethylene/vinyl acetate copolymers, and mixtures thereof.

These polyolefin-based resins include those resins produced by using a multi-site catalyst such as a Ziegler catalyst and those resins produced by using a single-site catalyst such as metallocene catalyst. Among these, linear low density polyethylene resins such as ethylene/α-olefin copolymers, polypropylene-based resins, and ethylene/propylene copolymers are particularly preferable in view of the moldability and the heat resistance of the obtained sheet.

These resins may be used singly or two or more of them may be used in combination. Further, taking into consideration the moldability, drawability or the like of the resultant sheet, it is preferable that the polyolefin resin has a melt index of about 0.2 g/10 min to about 3 g/10 min (190° C., load: 2.16 kg) in the case of polyethylene-based resins, about 0.5 g/10 min to about 30 g/10 min (230° C., load: 2.16 kg) in the case of polypropylene-based resins, and about 10 g/10 min to about 70 g/10 min (260° C., load: 2.16 kg) in the case of poly-4-methylpenetene-based resins. In the present invention, melt indices were measured according to the method prescribed by ASTM D-1238. The measurements were performed under respective conditions in the brackets.

Here, the polypropylene-based resins include propylene homopolymers, or copolymers of propylene with an α-olefin such as ethylene and hexene, or mixtures of these homopolymers. The polypropylene-based resins used in the present invention, which will be described hereinbelow, are preferably propylene homopolymers having a high crystallinity from the viewpoint of securing thermal dimensional property (thermal dimensional stability).

The polypropylene-based resin has a melt flow rate (MFR: JIS K-7210, measurement temperature: 230° C., load: 21.18

N) of preferably 0.50 g/10 min to 30 g/10 min, and more preferably 1.0 g/10 min to 20 g/10 min. The reason is as follows. If the melt flow rate of the polypropylene-based resin is too low, it is necessary to increase the extrusion temperature upon melt molding, resulting in that the light reflectance of the resultant film may be decreased due to yellowing of the polypropylene-based resin itself or deterioration by heat of titanium oxide. On the other hand, if the melt flow rate of the polypropylene-based resin is too high, production of sheets by melt molding becomes unstable.

The polymerization methods for obtaining the polypropylene-based resins that can be used include known methods, for example, a solution polymerization method, a bulk polymerization method, and a gas phase polymerization method. The polymerization catalysts that can be used include known catalysts, for example, titanium trichloride type catalysts, magnesium chloride-carrying type catalysts, metallocene-based catalysts.

In the case of the reflective film that contains titanium oxide in the film, the light reflecting properties are imparted making use of inflection and scattering of light at the interfaces between the base resin and the titanium oxide in the film. The inflection and scattering effect becomes greater as the difference in refractive index between the base resin and the titanium oxide is greater. Therefore, it is preferred to use a base resin having a relatively small refractive index so that the difference in refractive index between the base resin and the titanium oxide can be made large. Thus, it is preferred to use aliphatic polyesters having a refractive index of less than 1.50 than aromatic polyester containing an aromatic ring and having a refractive index of about 1.55 or more. Among the aliphatic polyesters, poly lactic acid-based resins having small refractive indices (refractive indices of less than 1.46) are preferably used.

Aliphatic polyester-based resins contain no aromatic rings in the molecular chain thereof and hence do not absorb ultraviolet rays. Therefore, the reflective films made therefrom do not deteriorate or yellow when exposed to ultraviolet rays or by the ultraviolet rays generated by the light source of the liquid crystal display device, thus causing no decrease in light reflectance of the film.

Examples of the aliphatic polyester-based resins include those aliphatic polyesters obtained by condensing aliphatic diols with aliphatic dicarboxylic acids, those aliphatic polyesters obtained by ring-opening polymerization of cyclic lactones, chemically synthesized aliphatic polyesters, and those aliphatic polyesters obtained by biosynthesis in microorganisms cells.

Examples of the aliphatic diol used in the aliphatic polyesters include ethylene glycol, 1,4-butanediol, and 1,4-cyclohexanedimethanol. Examples of the aliphatic dicarboxylic acid include succinic acid, adipic acid, suberic acid, sebacic acid, and dodecanedioic acid. By appropriately selecting at least one of the above-exemplified aliphatic diol compounds and at least one of the above-exemplified aliphatic dicarboxylic acid compounds and subjecting the selected compounds to condensation polymerization, the aliphatic polyesters or aliphatic aromatic polyesters can be obtained. Further, the molecular weight of the aliphatic polyesters can be increased with isocyanate compounds as necessary to obtain desired polymers.

The aliphatic polyesters obtained by ring opening polymerization of cyclic lactones can be obtained by polymerizing one or more of ring monomers, for example, ε-caprolactone, δ-valerolactone, and β-methyl-δ-valerolactone.

The chemically synthesized aliphatic polyesters include copolymers of cyclic oxide compounds with oxiranes, for example, succinic anhydride with ethylene oxide, propylene oxide or the like.

The aliphatic polyesters biosynthesized in microorganism cells include aliphatic polyesters biosynthesized by acetyl coenzyme A (acetyl CoA) in the cells of microorganisms including *Alcaligenes eutrophus*.The aliphatic polyesters biosynthesized in the microorganism cells include mainly poly-β-hydroxybutyric acid (poly3HB). However, to improve practical characteristics as plastics, it is industrially advantageous that hydroxyvaleric acid (HV) is copolymerized to formpoly(3HB-CO-3HV) copolymers. It is preferable that the copolymerization ratio of RV is generally 0 mol % to 40 mol %. Further, a long chain hydroxyalkanoate such as 3-hydroxyhexanoate, 3-hydroxyoctanoate, or 3-hydroxyoctadecanoate may be copolymerized.

In the present invention, it is preferable that the aliphatic polyester-based resin has a melting point of 100° C. or more and 170° C. or less. When the melting point of the aliphatic polyester-based resin is 100° C. or more and 170° C. or less, no decrease in light reflectance and dimensional stability of the resultant film occurs in a high temperature environment.

Further, the aliphatic polyester-based resins have a glass transition temperature of preferably 0° C. or less, and more preferably −20° C. or less. When the glass transition temperature of the aliphatic polyester-based resin is 0° C. or less, the resultant film is imparted with fracture resistance.

Note that the aliphatic polyester-based resins may be copolymers so far as they have a refractive index of less than 1.52 and include, for example, polybutylene succinate/lactide-based copolymers, which contain a lactic acid component in polybutylene succinate, polybutylene succinate/adipate copolymers.

The aliphatic polyester-based resins that can be commercially available include, for example, "BIONOLE" (registered trademark) 3000 series resins manufactured by Show a High polymer Co., Ltd. and GS-Pla manufactured by Mitsubishi Chemical Corporation.

Herein, the term "poly lactic acid-based resins" means homopolymers of D-lactic acid or L-lactic acid, or copolymers of these. Specifically, the poly lactic acid-based resins include poly(D-lactic acid) whose structural unit is D-lactic acid, poly(L-lactic acid) whose structural unit is L-lactic acid, and further, poly(DL-lactic acid) that is copolymers of L-lactic acid and D-lactic acid, and mixtures of these.

The poly lactic acid-based resins can be produced by known methods, such a condensation polymerization method and a ring-opening polymerization method. For example, according to the condensation polymerization method, D-lactic acid, L-lactic acid, or mixtures of these are directly subjected to condensation polymerization with dehydration to obtain poly lactic acid-based resins having a desired composition. Further, in the case of ring opening polymerization method, a lactic acid based resin having any desired composition can be obtained from a lactide, which is a cyclic dimer of lactic acid, in the presence of a predetermined catalyst and using a modifier as necessary. The lactides include L-lactide, which is a dimer of L-lactic acid, D-lactide, which is a dimer of D-lactic acid, and DL-lactide, which consists of L-lactic acid and D-lactic acid. These can be mixed as necessary and polymerized to obtain poly lactic acid-based resins having any desired composition and crystallinity.

The poly lactic acid-based resins used in the present invention preferably have a compositional ratio of D-lactic acid to L-lactic acid such that D-lactic acid:L-lactic acid=100:0 to 85:15, or D-lactic acid:L-lactic acid=0:100 to 15:85, more preferably D-lactic acid:L-lactic acid=99.5:0.5 to 95:5, or D-lactic acid:L-lactic acid=0.5:99.5 to 5:95. The poly lactic acid-based resins having a compositional ratio of D-lactic acid to L-lactic acid of 100:0 or 0:100 tend to have very high crystallinity, high melting point, and excellent heat resistance and excellent mechanical properties. That is, such poly lactic acid-based resins are preferable since upon their drawing or heat treatment, the resins crystallize to improve the heat resistance and mechanical properties. On the other hand, the poly lactic acid-based resins made of D-lactic acid and L-lactic acid are preferable since they are imparted therewith flexibility and films obtained therefrom have improved molding stability and drawing stability. Therefore, taking into consideration the balance between the heat resistance of and the molding stability and drawing stability of the obtained film, it is more preferable that the poly lactic acid-based resins have a compositional ratio of D-lactic acid to L-lactic acid such that D-lactic acid:L-lactic acid =99.5:0.5 to 95:5, or D-lactic acid:L-lactic acid =0.5:99.5 to 5:95.

In the present invention, poly lactic acid-based resins with different copolymerization ratios of D-lactic acid to L-lactic acid may be blended. In this case, adjustment of the compositional ratios of the poly lactic acid-based resins such that an average value of the compositional ratios of a plurality of lactacic acid based resins falls within the above-mentioned ranges of the compositional ratio can provide the above-mentioned balanced properties. Blending homopolymers of D-lactic acid and L-lactic acid and copolymers thereof makes it possible to have bleed stability and development of heat resistance well balanced.

The poly lactic acid-based resins used in the present invention preferably have high molecular weights, for example, weight-average molecular weights of preferably 50,000 or more, more preferably 60,000 or more and 400,000 or less, and particularly preferably 100,000 or more and 300,000 or less. When the poly lactic based resin has a weight-average molecular weight of less than 50,000, the obtained film may sometimes have poor mechanical properties.

Commercially available poly lactic acid-based resins include LACEA (registered trademark) series resins manufactured by Mitsui Chemicals, Inc., Nature Works series resins manufactured by Cargill-Dow Co.

The reflective film of the present invention may have a layer B comprised by a resin composition B in addition to the layer A comprised by the resin composition A. The resin composition B may contain a fine powder filler. In this construction, at least one layer B must be arranged on the outer surface of the layer A. For example, layer constructions of layer B/layer A, layer B/layer A/layer B, and layer B/layer B/layer A/layer B can be used. Further, the reflective film may further include one or more layers other than the layers A and B.

When the reflective film of the present invention is of a laminate structure having a layer A and a layer B, it is necessary that the amount of the titanium oxide contained in the layer A is more than the amount of the fine powder filler contained in the layer B. The fine powder filler contained in the layer B is preferably one that has a large difference in refractive index between the base resin that constitute the layer B and the fine powder filler. For example, an inorganic fine powder is used. Particularly, an inorganic fine powder having a high refractive index is preferably used. Specifically, it is preferable to use calcium carbonate, barium sulfate, titanium oxide, and zinc oxide, having a refractive index of 1.6 or more. Particularly, titanium oxide among these is preferably used. By blending titanium oxide in the resin composition B for forming the layer B, high reflecting performance can be imparted to the resultant film with a much smaller filler amount and when the thickness of the film is small, high reflecting performance can be imparted to the film.

The titanium oxide used in the layer B may be the same as the titanium oxide used in the layer A. Titanium oxide other than the titanium oxide having a low vanadium content that is required for the layer A may also be used singly or as mixtures. Further, the above-mentioned fine powder filler and titanium oxide can be used in combination.

Usually, to impart high light reflectance to the reflective film, a large amount of titanium oxide is added to the base resin. However, the reflective film that contains a large amount of titanium oxide causes dropout of grains or occurrence of die drools. The dropped out grains or die drool may serve as a starting point for breakage upon film formation by drawing to cause breakage troubles, so that production of the films can not be performed in a stable manner.

In the present invention, more titanium oxide is contained in the layer A that is arranged inside the film to adjust the reflecting performance of the film while less titanium oxide contained in the layer B that is arranged on the outer surface of the film to adjust the surface characteristics and processability of the film. When the amount of titanium oxide contained increases, the mechanical strength of the film tends to be decreased. However, when there is a difference in content between the amount of the titanium oxide contained in the layer A and the amount of the fine powder filler (titanium oxide) contained in the layer B, that is, when a relatively large amount of titanium oxide is blended in the layer A and a relatively small amount of the fine powder filler is blended in the layer B, as in the case of the reflective film of a laminate construction according to the present invention, the film can be imparted with reflecting performance while a decrease in mechanical strength of the film is prevented.

To adjust the surface characteristics of the resultant film, it is necessary that the amount of the fine powder filler contained in the layer B is 30 mass % or less, more preferably 20 mass % or less. Taking into consideration surface gloss, and uneven luminance, the content of the fine powder filler is preferably 5 mass % or more, for example, 5 mass % or more and 30 mass % or less, more preferably 5 mass % or more and 20 mass % or less, and particularly preferably 10 mass % or more and 20 mass % or less.

Resins similar to the base resin used in the layer A can be used as a base resin that constitutes the layer B. For example, low refractive index resins such as acrylic-based resins, aliphatic polyester-based resins, fluoro-based resins, and polyolefin-based resins can be used.

In the case where the reflective film of the present invention is of a laminate structure that has a layer A and a layer B, it is preferable that the thickness of the layer B is 5% or more and 25% or less of the total thickness of the reflective film. When the thickness of the layer B is 5% or more of the total thickness of the reflective film, the layer B can exhibit a function as an outer layer intended to adjust the surface characteristics of the film while when the thickness of the layer B is 25% or less, a sufficient reflecting performance can be satisfied.

Recently, however, liquid crystal displays have been used not only as displays for personal computers but also as displays for car navigation systems and car-mounted small television sets and hence liquid crystal displays that can endure high temperatures and high humidities are being required. Accordingly, to impart durability to aliphatic polyester-based resin reflective films, a hydrolysis inhibitor may be added to the aliphatic polyester-based resin. The hydrolysis inhibitors that can be advantageously used in the present invention include, for example, carbodiimide compounds.

For example, in cars parking under the scorching sun in summer seasons, car navigation systems, car-mounted small television sets and the like are subjected to high temperatures. When the liquid crystal display devise is used for a long time, the periphery of the light source lamp is subjected to high temperatures. Accordingly, the reflective film used in liquid crystal displays for use in car navigation systems, liquid crystal display devices is required to have heat resistance to temperatures at about 80° C. The inventors of the present invention have studied extensively and as a result, it has been found that heat resistance and dimensional stability in a heated environment can be maintained by rendering the film substantially non-drawn. In the present invention, "substantially non-drawn" means that the area magnification is less than 1.2 times. By rendering the film substantially non-drawn, the change in dimension in a heated environment can be minimized.

Also, to respond to the need of provide large-sized liquid crystal displays, the reflective film may be also required to be larger in size. For example, when a reflective film is incorporated as a reflective sheet for a large screen liquid crystal television set, it is used for a long period of time in a state where they are exposed to light source. Therefore, reflective films that undergo no change in dimension are desired. Furthermore, when a reflective film is incorporated in a medium or small edge-light type display, a reflective film that shows less change in size is desired where there is a restriction to the edge.

In the present invention, it is preferable that the reflective film has, as specific thermal properties for responding to these requirements, a heat shrinkage ratio after retention at 80° C. for 180 minutes of preferably greater than −0.1% and less than 1.0%, and more preferably greater than −0.1% and less than 0.7% in each of longitudinal direction (MD) and transverse direction (TD). Here, the "longitudinal direction" means a direction that is the same as the direction in which the film flows (the direction in which the film is taken up), and the "transverse direction" means a direction that is perpendicular to the direction in which the film flows.

When the heat shrinkage ratio of the aliphatic polyester-based resin reflective film is within the above-mentioned range, the film does not undergo deformation with time so that the film can retain flatness when used in the back of a large-sized liquid crystal television set.

In the present invention, the resin composition may further contain antioxidants, light stabilizers, heat stabilizers, lubricants, dispersants, ultraviolet absorbents, white pigments, fluorescent brighteners, and other additives so far as they do not damage the effects of the present invention.

From the view point of dimensional stability, the reflective film of the present invention must be substantially non-drawn. For example, a reflective plate that includes the reflective film of the present invention is incorporated into, for example, a large-sized liquid crystal television set, the reflective plate is used for long period of time in a state where it is exposed to light source, so that undulations or wrinkles occur in the reflective film. Therefore, it is necessary to prevent the occurrence of the undulations and wrinkles and it is required that the film satisfies predetermined thermal characteristics. For example, it is necessary that the film has a heat shrinkage ratio after retention at 80° C. for 180 minutes of greater than −0.1% and less than 1.0% in both the longitudinal direction (MD) and transverse direction (TD), and preferably greater than 0% and less than 0.7% in both the longitudinal direction (MD) and transverse direction (TD).

The reflective film of the present invention on its surface has a light reflectance of 95% or more and more preferably 97% or more for light having a wavelength of about 550 nm. When such a light reflectance is 95% or more, the reflective film exhibits good reflecting property, so that it can provide sufficient illuminance to the screen of, for example, a liquid crystal display.

It is preferable that the reflective film retains an excellent light reflectance even after it is exposed to ultraviolet rays. When the acrylic-based resins or aliphatic polyester-based resins containing no aromatic rings in the molecular chain are used as a base resin, the reflective film is not deteriorated due to ultraviolet rays and can retain excellent light reflectance.

As described above, when titanium oxide having a vanadium content of 5 ppm or less is used, highlight reflecting performance can be achieved when no voids are present in the inside of the film. Presumably, this is ascribable to the high refractive index and hence high hiding power of titanium oxide. Since no voids are present in the inside of the reflective film of the present invention, use of such titanium oxide enables improvement of the mechanical properties of the film while retaining high reflecting performance. Thus absence of voids in the inside of the film is advantageous also in improving the dimensional stability of the film. Further, even when the film is thin, if high light reflecting performance is ensured, the film can be used as a reflective film for use as a reflective film for small, thin liquid crystal displays for, for example, note-type personal computers and mobile phones.

Hereinafter, the method of producing the reflective film of the present invention will be described by way of examples. However, the present invention should not be construed as being limited thereto.

First, a resin having a refractive index of less than 1.52 (low refractive index resin) is blended with titanium oxide and optionally additives as necessary to prepare a resin composition A. In the case of a laminate construction, a resin composition B which comprises a base resin blended with a fine powder filler and one or more other additives as necessary, is also prepared. Specifically, a composition obtained by adding titanium oxide and further an additive such as hydrolysis inhibitor as necessary to the low refractive index resin and in the case of a laminate construction, a composition obtained by adding a fine powder filler (titanium oxide and so on) as necessary to the base resin (low refractive index resin and so on) are prepared. These are respectively mixed in a ribbon blender, a tumbler, a Henschel mixer or the like and then kneaded using a Banbury mixer, a single-screw, a twin-screw extruder or the like at a temperature (for example, in case the base resin is poly lactic acid, at the temperature of 170° C. to 230° C.) equal to or higher than the melting temperature of the resin to give a resin composition A and also a resin composition B in the case of the laminate construction. Alternatively, the resin composition can also be obtained by feeding predetermined amounts of the base resin such as a low refractive index resin, the fine powder filler such as titanium oxide, and additives from separate feeders, respectively. Alternatively, the resin composition can also be obtained by preparing in advance a master batch obtained by blending a portion of the base resin with the fine powder filler such as titanium oxide, additives and so on in high concentrations, and mixing the master batch with another portion of the base resin to desired concentrations of the components.

Then, the thus-obtained resin composition A and optionally the resin composition B are each melted and formed into a film. For example, after the resin composition is dried, the resin composition is fed to an extruder (in the case of the laminate construction, the resin composition A and the resin composition B are fed to respective extruders), and heated to a temperature that is equal to or higher than the melting point of the resin to melt the resin. Alternatively, the resin composition maybe fed to the extruder without drying the resin composition. However, when the aliphatic polyester-based resin or the acrylic-based resin is used as the low refractive index resin, it is preferable that they are dried in advance. When the aliphatic polyester-based resin composition or the acrylic-based resin is not dried, it is preferable that a vacuum vent be used when the resin composition is melt-extruded. The conditions of extrusion such as extrusion temperature are preferably set depending on the kind of the low refractive index resin as appropriate. In the case of resins that undergo reduction in molecular weight due to decomposition, such as the aliphatic polyester-based resin, the extrusion conditions must be set taking this into consideration. For example, the extrusion temperature is preferably in the range of 170° C. to 230° C. in the case of poly lactic acid, and in the range of 190° C. to 230° C. in the case of polypropylene-based resin. Thereafter, the molten resin composition is extruded from a slit-shaped discharge nozzle of a T-die and contacted with a cooling roll to solidify the resin composition to form a cast sheet. The temperature of the cooling roll is not particularly limited but it is preferable that the temperature of the cooling roll is, for example, within the range of 40° C. or more and 100° C. or less.

The reflective film of the present invention preferably has a low draft ratio (degree of draw down) upon film extrusion and more preferably has a draft ratio of 20 or less. The draft ratio gives an influence on thermal dimension property of the reflective film; when the film has a high draft ratio, the film has a high shrinkage ratio in the longitudinal direction of the film to cause expansion in the transverse direction in some cases. Note that the draft ratio as used herein refers to one represented by the following equation.

Draft ratio (degree of draw down)=(thickness of film)/(discharge lip opening)

In the present invention, to impart the reflective film with heat resistance and dimensional stability, it is preferable to perform heat fixation. In particular, in the case of crystalline resins, heat treatment of extrusion-formed films results in a further improvement of dimensional stability. The treating temperature for heat fixation of the film is, for example, 90° C. Togo 160° C. An more preferably 110° C. Togo 140° C. I the case of the aliphatic polyester-based resin. The treating time required for the heat fixation is preferably 1 second to 5 minutes.

The thickness of the reflective film of the present invention, which is not particularly limited, is usually about 30 µm to about 500 µm and preferably about 50 µm to about 500 µm taking into consideration of handleability in practical applications. In particular, it is preferable that the reflective film for use in small, thin reflective plate has a thickness of 30 µm to 100 µm. Reflective films with such a thickness can be used in, for example, small, thin liquid crystal displays for note-type personal computers, mobile phones and so on.

By using the reflective film of the present invention, reflective plates used in, for example, liquid crystal displays can be formed. For example, the reflective film is applied onto a metal plate or a resin plate to form a reflective plate. The reflective plate is useful as a reflective plate that can be used in a liquid crystal device, a lighting apparatus, an illuminated sign and so on. Hereinafter, an example of the method of producing such a reflective plate is explained.

The methods of covering a metal plate or a resin plate with the reflective film of the present invention include a method that involves use of an adhesive, a method of heat sealing without using adhesives, a method of bonding through an adhesive sheet, a method of extrusion coating and so on and is not particularly limited. For example, the reflective film can be attached to a metal or resin plate by coating an adhesive made of polyester-based, polyurethane-based, epoxy-based resin or the like on a side of the metal or resin plate on which the reflective film is to be attached and then applying the reflective film on the adhesive. In this method, the adhesive is coated on the surface of the metal plate and soon to which the reflective film is to be applied to a thickness of about 2 µm to about 4 µm after drying by using a coating installation usually used, such as a reverse roll coater or a kiss roll coater. Then, the coated surface is dried and heated by an infrared ray heater and a hot-air circulating oven to maintain the surface of the plate at a predetermined temperature while the reflective film is applied directly to the metal plate or the resin plate by using a roll laminator, followed by cooling to obtain a reflective plate. In this case, it is preferable to maintain the surface of the metal plate and so on at 210° C. or less, since light reflecting properties of the reflective plate can be maintained at high levels.

EXAMPLES

Hereinafter, the present invention is explained in more detail by examples. However, the present invention should not be considered to be limited thereto. Instead, various applications or modifications may be made without departing the technical concept of the present invention. Measurements and evaluations in the following examples were performed as follows. Here, the direction in which the film is taken up (direction of flow of film) is indicated by MD and the direction perpendicular thereto is indicated by TD.

(Measurement and Evaluation Methods)

(1) Light Reflectance (%)

By using a spectrophotometer ("U-4000", manufactured by Hitachi Limited) with an integrating sphere, light reflectance of a sample film for light having a wavelength of 550 nm was measured. Note that before the measurement, the spectrophotometer was set such that the light reflectance of an alumina white plate was 100%.

(2) Heat Shrinkage Ratio (%)

200 mm-wide gauge lines were marked in MD and TD directions, respectively, of a film and the film was cut along the gauge lines to provide sample films. The cut-out sample films were retained in a hot-air circulating oven at a temperature of 80° C. for 180 minutes and then a heat shrinkage of the sample films was measured. A ratio of the measured heat shrinkage to the original size (200 mm) of the sample films before placing them in the oven was expressed in percentage (%), which was defined as heat shrinkage ratio (%).

(3) Refractive Index

The refractive index of the resins was measured according to the method A of JIS K-7142 while the refractive index of titanium oxide was measured according to the method B of JIS K-7142.

(4) Content (ppm) of Vanadium in Titanium Oxide

To 0.6 g of titanium oxide was added 10 ml of nitric acid and the mixture was left to stand in a microwave-type incinerator for 80 minutes to decompose it. The obtained solution was subjected to quantitative analysis by using an ICP emission spectrophotometer.

(5) Average Particle Diameter

By using a powder specific surface area measuring apparatus (permeation method), model "SS-100" manufactured by Shimadzu Corporation with a sample tube of 2 cm² in cross section and 1 cm in height, measurement of time in which 20 cc of air was permeated through a 3-g sample packed in the sample tube at 500 mm H₂O was repeated and an average particle diameter of the sample was calculated from the measured values.

(6) Yellowing Preventing Properties

Film samples were irradiated with ultraviolet rays for 1,000 hours in a sunshine weatherometer tester (without intermittent spray of water). Thereafter, the film samples were observed with naked eye. By visual judgment, the film sample of which the color of the film surface was judged to be white was indicated as "white", and the film sample of which the color of the film surface was judged to be yellowish was indicated as "yellow".

Also, film samples after irradiation of ultraviolet rays were determined for light reflectance (%) according to the measurement method described in (1) above.

Example 1

60 mass % of polybutylene succinate lactide-based polymer (GS-PLa AZ91T: manufactured by Mitsubishi Chemical Corporation, a refractive index of 1.51) and 40 mass % of rutile-type titanium oxide (coated with alumina and silica, a vanadium content of 0.5 ppm, a refractive index of 2.7) having an average particle diameter of 0.25 μm were mixed to form a mixture. This mixture was kneaded in a twin-screw extruder at 180° C. Then, the resin composition in a molten state was extruded from a T-die at 180° C. into a sheet, which was cooled and solidified to prepare a reflective film having a thickness of 250 μm.

The obtained reflective film was measured and evaluated for light reflectance before and after the irradiation with ultraviolet rays, heat shrinkage ratio, and yellowing preventing property. Table 1 shows the results obtained.

Example 2

As shown in Table 1, 60 mass % of a polypropylene-based resin (NOVATEC PP FY4: manufactured by Japan Polypropylene Corporation, a refractive index of 1.50) and 40 mass % of rutile-type titanium oxide (coated with alumina and silica, a vanadium content of 0.5 ppm, a refractive index of 2.7) having an average particle diameter of 0.25 μm were mixed to form a mixture. This mixture was kneaded in a twin-screw extruder at 200° C. Then, the resin composition in a molten state was extruded from a T-die at 200° C. into a sheet, which was cooled and solidified to prepare a reflective film having a thickness of 250 μm.

The obtained reflective film was measured and evaluated in the same manner as that in Example 1.Table 1 shows the results obtained.

Example 3

As shown in Table 1, 50 mass % of a rubber-dispersed polymethyl methacrylate-based resin (SUMIPEX IRD 50: manufactured by Sumitomo Chemical Co., Ltd., a refractive index of 1.49) and 50 mass % of rutile-type titanium oxide (coated with alumina and silica, a vanadium content of 0.5 ppm, a refractive index of 2.7) having an average particle diameter of 0.25 μm were mixed to form a mixture. This mixture was kneaded in a twin-screw extruder at 230° C. Then, the resin composition in a molten state was extruded from a T-die at 230° C. into a sheet, which was cooled and solidified to prepare a reflective film having a thickness of 250 μm.

The obtained reflective film was measured and evaluated in the same manner as that in Example 1.Table 1 shows the results obtained.

Comparative Example 1

As shown in Table 1, 60 mass % of polybutylene succinate lactide-based polymer (GS-PLa AZ91T: manufactured by Mitsubishi Chemical Corporation, a refractive index of 1.51) and 40 mass % of titanium oxide (TITANIX JR-805: manufactured by Tayca Co., Ltd., a vanadium content of 6 ppm, a refractive index of 2.7) having an average particle diameter of 0.29 μm were mixed to form a mixture. This mixture was kneaded in a twin-screw extruder at 180° C. Then, the resin composition in a molten state was extruded from a T-die at 180° C. into a sheet, which was cooled and solidified to prepare a reflecting film having a thickness of 250 μm.

The obtained reflective film was measured and evaluated in the same manner as that in Example 1. Table 1 shows the results obtained.

Comparative Example 2

As shown in Table 1, 60 mass % of polybutylene succinate lactide-based polymer (GS-PLa AZ91T: manufactured by Mitsubishi Chemical Corporation, a refractive index of 1.51) and 40 mass % of titanium oxide (KRONOS KR470: manufactured by Titan Kogyo Co., Ltd., a vanadium content of 6 ppm, a refractive index of 2.7) having an average particle diameter of 0.30 μm were mixed to form a mixture. This mixture was kneaded in a twin-screw extruder at 180° C. Then, the resin composition in a molten state was extruded from a T-die at 180° C. into a sheet, which was cooled and solidified to prepare a reflective film having a thickness of 250 μm.

The obtained reflective film was measured and evaluated in the same manner as that in Example 1.Table 1 shows the results obtained.

Comparative Example 3

As shown in Table 1, 60 mass % of a copolymer polyester resin (PETG6763: manufactured by Eastman, a refractive index of 1.56) and 40 mass % of rutile-type titanium oxide (coated with alumina and silica, a vanadium content of 0.5 ppm, a refractive index of 2.7) having an average particle diameter of 0.25 μm were mixed to form a mixture. This mixture was kneaded in a twin-screw extruder at 240° C. Then, the resin composition in a molten state was extruded from a T-die at 240° C. into a sheet, which was cooled and solidified to prepare a reflective film having a thickness of 250 μm.

The obtained reflecting film was measured and evaluated in the same manner as that in Example 1. Table 1 shows the results obtained.

TABLE 1

|  | Refractive Index and (Blending Ratio*) | | Titanium Oxide | | Light reflectance (%) at 550 nm | | Heat Shrinkage Ratio | | Yellowing Preventing Property |
|---|---|---|---|---|---|---|---|---|---|
|  | Resin | Titanium Oxide | Vanadium Content (ppm) | Particle Diameter (μm) | Before UV Irradiation | After UV Irradiation | MD | TD | Color |
| Example 1 | 1.51(60) | 2.7(40) | 0.5 | 0.25 | 99.4 | 97.9 | 0.20 | 0.27 | White |
| Example 2 | 1.50(60) | 2.7(40) | 0.5 | 0.25 | 98.8 | 96.7 | 0.15 | 0.12 | White |
| Example 3 | 1.49(50) | 2.7(50) | 0.5 | 0.25 | 98.1 | 96.3 | 0.25 | 0.25 | White |
| Comparative Example 1 | 1.51(60) | 2.7(40) | 6.0 | 0.29 | 94.3 | 91.8 | 0.21 | 0.26 | White |
| Comparative Example 2 | 1.51(60) | 2.7(40) | 6.0 | 0.30 | 93.8 | 91.4 | 0.22 | 0.28 | White |
| Comparative Example 3 | 1.56(60) | 2.7(40) | 0.5 | 0.25 | 92.9 | 87.5 | 0.19 | 0.21 | Yellow |

*Values in the brackets are blending ratios in mass %.

Table 1 indicates that the reflective films of Examples 1 to 3 according to the present invention exhibited a high light reflectance as high as 95% or more at 550 nm and showed substantially no decrease in light reflectance after irradiation with ultraviolet rays and no yellowing. The reflective films of Examples 1 to 3 had a heat shrinkage ratio of less than 1.0% in each of the longitudinal direction and the transverse direction, thus showing excellent dimensional stability and also excellent film forming property. That is, it revealed that the reflective films of Examples 1 to 3 of the present invention showed excellent results in all the evaluation items.

On the other hand, it revealed that the reflective films of Comparative Examples 1 to 3 had a light reflectance at 550 nm of less than 95% and thus were inferior to the reflective films of Examples 1 to 3 in respect of light reflectance. The reflecting film of Comparative Example 3 yellowed.

Example 4

50 mass % of a polypropylene-based resin (NOVATEC PP FY4: manufactured by Japan Polypropylene Corporation, a refractive index of 1.50) and 50 mass % of titanium oxide (manufactured by Ishihara Sangyo Kaisha, Ltd., alumina-silica-zirconia-siloxane treated, a vanadium content of 5 ppm or less) having an average particle diameter of 0.25 μm were mixed to prepare a resin composition A. On the other hand, 90 mass % of a polypropylene-based resin (NOVATEC PP FY4: manufactured by Japan Polypropylene Corporation, a refractive index of 1.50) and 10 mass % of titanium oxide having an average particle diameter of 0.25 μm were mixed to prepare a resin composition B for front and back layers. The resin composition A and the resin composition B were melted in respective extruders set at temperatures within the range of 190° C. Togo 210° C. An extruded in extrusion amounts in a ratio of layer A : layer B=5:1, by merging through a mouth ring at 210° C. Togo form a two-kind-three-layer flow (thickness ratios being layer B:layer A:layer B=1:10:1). Then, the resultant was cooled with a cast roll at 90° C. Togo prepare a reflective film having a thickness of 220 μm. Note that a T-die having a discharge lip opening of 1 mm was used as the mouth ring. The draft ratio (degree of draw down) used then was about 4.5.

The obtained reflective film was measured and evaluated for light reflectance before and after the irradiation with ultraviolet rays, heat shrinkage ratio, and yellowing preventing property. Table 2 shows the results obtained. Further, observation was made as to whether die drools were attached to the lip portion of the mouth ring. It was observed that no die drool occurred.

Example 5

50 mass % of a polypropylene-based resin (NOVATEC PP FY4: manufactured by Japan Polypropylene Corporation, a refractive index of 1.50) and 50 mass % of titanium oxide (manufactured by Ishihara Sangyo Kaisha, Ltd., alumina-silica-siloxane-treated, a vanadium content of 5 ppm or less) having an average particle diameter of 0.21 μm were mixed to prepare a resin composition A. On the other hand, 90 mass % of a polypropylene-based resin (NOVATEC PP FY4: manufactured by Japan Polypropylene Corporation, a refractive index of 1.50) and 10 mass % of titanium oxide having an average particle diameter of 0.215 μm (manufactured by Ishihara Sangyo Kaisha, Ltd., alumina-silica-polyol-treated, a vanadium content of 5 ppm or less) were mixed to prepare a resin composition B for front and back layers. The resin composition A and the resin composition B were melted in respective extruders set at temperatures within the range of 190° C. Togo 210° C. An extruded in extrusion amounts in a ratio of layer A:layer B=5:1, by merging through a mouth ring at 210° C. Togo form a two-kind-three-layer flow (thickness ratios being layer B:layer A:layer B=1:10:1). Then, the resultant was cooled with a cast roll at 90° C. Togo prepare a reflective film having a thickness of 220 μm. Note that a T-die having a discharge lip opening of 1 mm was used as the mouth ring. The draft ratio (degree of draw down) used then was about 4.5.

The obtained reflective film was measured and evaluated for light reflectance before and after the irradiation with ultraviolet rays, heat shrinkage ratio, and yellowing preventing property. Table 2 shows the results obtained. Further, observation was made as to whether die drools were attached to the lip portion of the mouth ring. It was observed that no die drool occurred.

TABLE 2

|  | Layer A | Layer B | Light Reflectance (%) at 550 nm | | Heat Shrinkage Ratio (%) | | Yellowing Preventing Property |
| --- | --- | --- | --- | --- | --- | --- | --- |
|  |  |  | Before UV Irradiation | After UV irradiation | MD | TD | Color |
| Example 4 | FY4/Titanium Oxide = 50/50 | FY4/Titanium Oxide = 90/10 | 97.6 | 95.2 | 0.15 | 0.02 | White |
| Example 5 | FY4/Titanium Oxide = 50/50 | FY4/Titanium Oxide = 90/10 | 98.2 | 96.4 | 0.22 | 0.01 | White |

Table 2 indicates that the reflective films of Examples 4 and 5 exhibited a high light reflectance as high as 95% or more at 550 nm and showed substantially no decrease in light reflectance after irradiation with ultraviolet rays and no yellowing. The reflective films of Examples 4 and 5 had a heat shrinkage ratio of less than 1.0% in each of the longitudinal direction and the transverse direction, thus showing excellent dimensional stability, causing no die drool, and having also excellent film forming property.

Further, the reflective films obtained in Examples 1 to 5 were each applied to a zinc-plated steel plate (0.45 mm thick) to prepare a reflective plate. That is, first a polyester-based adhesive (commercially available product) was coated on a surface of the zinc-plated steel plate on which the reflective film was to be applied to a thickness of about 2 to about 4 μm after drying. Then, the coated surface was dried and heated by using an infrared heater and a hot-air heating oven. Then, immediately the reflective film was applied by using a roll laminator, and cooled to obtain a reflective plate. The obtained reflective plate had excellent processability and high light reflectance.

That is, according to the present invention, a reflective film that has an excellent light reflectance, that does not undergo yellowing or a decrease in light reflectance with time when in use, and that has excellent dimensional stability can be obtained. Further, since the reflective film of the present invention contains a low refractive index resin and specified titanium oxide, high light reflectance can be achieved in the absence of voids. Therefore, it is unnecessary to perform drawing the film in order to form voids therein, so that the reflective film can be made substantially non-drawn, thereby exhibiting excellent mechanical strength and excellent dimensional stability. Also, the reflective plate that includes the reflective film of the present invention has excellent processability and high light reflectance.

The present invention is applicable to reflective films and reflective plates that are used in liquid crystal display devises, lighting apparatus, illuminated signs and so on and as reflective films in similar fields. Further, the reflective films of the present invention can be utilized as reflective films of which high light reflectance is required and as reflective films of which small thicknesses are required.

The invention claimed is:

1. A reflective film comprising a layer A that includes a resin composition A containing a resin and titanium oxide, wherein the reflective film is a substantially non-drawn film, wherein the resin has a refractive index of less than 1.52, wherein the titanium oxide has a refractive index of 2.5 or more, and a vanadium content of 5 ppm or less, and wherein the film has a light reflectance of 95% or more to light having a wavelength of 550 nm, and a heat shrinkage ratio after treatment at 80°C. for 180 minutes of −0.1% or more and less than 1.0% in both a longitudinal direction (MD) and in a transverse direction (TD).

2. The reflective film as claimed in claim 1, wherein the content of the titanium oxide is 10 mass % or more and 60 mass % or less in the resin composition A.

3. The reflective film as claimed in claim 2, further comprising a layer B that includes a resin composition B containing a fine powder filler on an outer surface of the layer A, wherein the amount of the fine powder filler contained in the layer B is smaller than that of the titanium oxide contained in the layer A.

4. The reflective film as claimed in claim 1, wherein the content of the titanium oxide is 30 mass % or more and 60 mass % or less in the resin composition A.

5. The reflective film as claimed in claims 1, further comprising a layer B that includes a resin composition B containing a fine powder filler on an outer surface of the layer A, wherein the amount of the fine powder filler contained in the layer B is smaller than that of the titanium oxide contained in the layer A.

6. The reflective film as claimed in claim 5, wherein the layer B contains 30 mass % or less of the fine powder filler in the resin composition B.

7. The reflective film as claimed in claim 6, wherein the fine powder filler is titanium oxide.

8. The reflective film as claimed in claims 1, wherein a surface of the titanium oxide is covered with at least one inert inorganic oxide selected from the group consisting of silica, alumina, and zirconia.

9. The reflective film as claimed in claims 1, wherein the titanium oxide has an average particle diameter of 0.1 μm or more to 1.0 μm or less.

10. The reflective film as claimed in claims 1, wherein the resin having a refractive index of less than 1.52 is at least one resin selected from the group consisting of polyolefin-based resins, acrylic-based resins, fluoro-based resins, and aliphatic polyester-based resins.

11. A reflective plate comprising the reflective film as claimed in claims 1.

* * * * *